United States Patent
Schneider et al.

(10) Patent No.: US 11,801,461 B2
(45) Date of Patent: Oct. 31, 2023

(54) PLEATED FILTER ELEMENT HAVING AN ADDITIONAL STRUCTURE

(71) Applicant: HYDAC FILTER SYSTEMS GMBH, Sulzbach/Saar (DE)

(72) Inventors: Dominic Schneider, Namborn (DE); Nils Schubert, Erfurt (DE); Andreas Schunk, Waldmohr (DE)

(73) Assignee: HYDAC FILTER SYSTEMS GMBH, Sulzbach/Saar (DE)

( * ) Notice: Subject to any disclaimer, the term of this patent is extended or adjusted under 35 U.S.C. 154(b) by 339 days.

(21) Appl. No.: 16/099,472

(22) PCT Filed: May 3, 2017

(86) PCT No.: PCT/EP2017/000552
§ 371 (c)(1),
(2) Date: Nov. 7, 2018

(87) PCT Pub. No.: WO2017/194185
PCT Pub. Date: Nov. 16, 2017

(65) Prior Publication Data
US 2019/0160399 A1 May 30, 2019

(30) Foreign Application Priority Data
May 10, 2016 (DE) ...................... 10 2016 005 762.9

(51) Int. Cl.
*B01D 29/21* (2006.01)
*B01D 29/11* (2006.01)
(Continued)

(52) U.S. Cl.
CPC ............. *B01D 29/21* (2013.01); *B01D 27/06* (2013.01); *B01D 29/111* (2013.01); *B01D 29/54* (2013.01);
(Continued)

(58) Field of Classification Search
CPC .................. B01D 29/21; B01D 29/111; B01D 2201/293; B01D 2201/127;
(Continued)

(56) References Cited

U.S. PATENT DOCUMENTS 3,426,910 A * 2/1969 Winzen .................. B01D 29/21
210/493.1
3,870,495 A 3/1975 Dixson et al.
(Continued)

FOREIGN PATENT DOCUMENTS

| DE | 2 034 670 | 1/1972 | |
|----|-----------|--------|---|
| DE | 2034670 A1 * | 1/1972 | ............. B01D 46/10 |

(Continued)

OTHER PUBLICATIONS

English Machine Translation of DE 2034670.*
(Continued)

*Primary Examiner* — Madeline Gonzalez
(74) *Attorney, Agent, or Firm* — WENDEROTH, LIND & PONACK, L.L.P.

(57) ABSTRACT

A filter element has a pleated filter mat (3). The terminal axial ends (7, 8) of the mat are connected to end caps (9, 11). The mat has a main structural layer (15) having filtering properties and a first additional structural layer and a second additional structural layer (17,19). The surface area of each of the additional structural layers (17, 19) is smaller than the surface area of the main structural layer (15). The axial ends (12, 14) of one additional structural layer (17) is located at an axial distance from the axial ends (16, 18) of the other additional structural layer (19) on the filter mat (3).

18 Claims, 5 Drawing Sheets

(51) Int. Cl.
*B01D 46/52* (2006.01)
*B01D 27/06* (2006.01)
*B01D 29/54* (2006.01)

(52) U.S. Cl.
CPC ......... *B01D 46/521* (2013.01); *B01D 46/523* (2013.01); *B01D 2201/127* (2013.01); *B01D 2201/188* (2013.01); *B01D 2201/293* (2013.01)

(58) Field of Classification Search
CPC ............ B01D 2201/188; B01D 46/521; B01D 27/06; B01D 46/523; B01D 29/54; B01D 29/016; B01D 29/031; B01D 29/038; B01D 33/0191; B01D 2201/12; B01D 2201/31; B01D 2201/40
USPC .............. 210/493.2, 493.1, 495, 497.01, 487
See application file for complete search history.

(56) References Cited

U.S. PATENT DOCUMENTS

| | | | | |
|---|---|---|---|---|
| 2009/0260420 | A1* | 10/2009 | Stevenson | G01N 30/6052 73/23.41 |
| 2010/0084334 | A1* | 4/2010 | Galifi | B29C 66/12441 210/497.01 |
| 2011/0265651 | A1* | 11/2011 | Steiner | B01D 46/0058 95/279 |
| 2012/0037561 | A1 | 2/2012 | Schaeper | |
| 2015/0360163 | A1 | 12/2015 | Schaeper | |

FOREIGN PATENT DOCUMENTS

| | | | |
|---|---|---|---|
| DE | 10 2004 061 078 | 6/2006 | |
| DE | 102004061078 A1 * | 6/2006 | ............ B01D 29/21 |
| DE | 10 2011 119 408 | 5/2013 | |
| WO | 2010/059089 | 5/2010 | |

OTHER PUBLICATIONS

English Translation of DE 2034670.*
International Search Report (ISR) dated Jul. 7, 2017 in International (PCT) Application No. PCT/EP2017/000552.

* cited by examiner

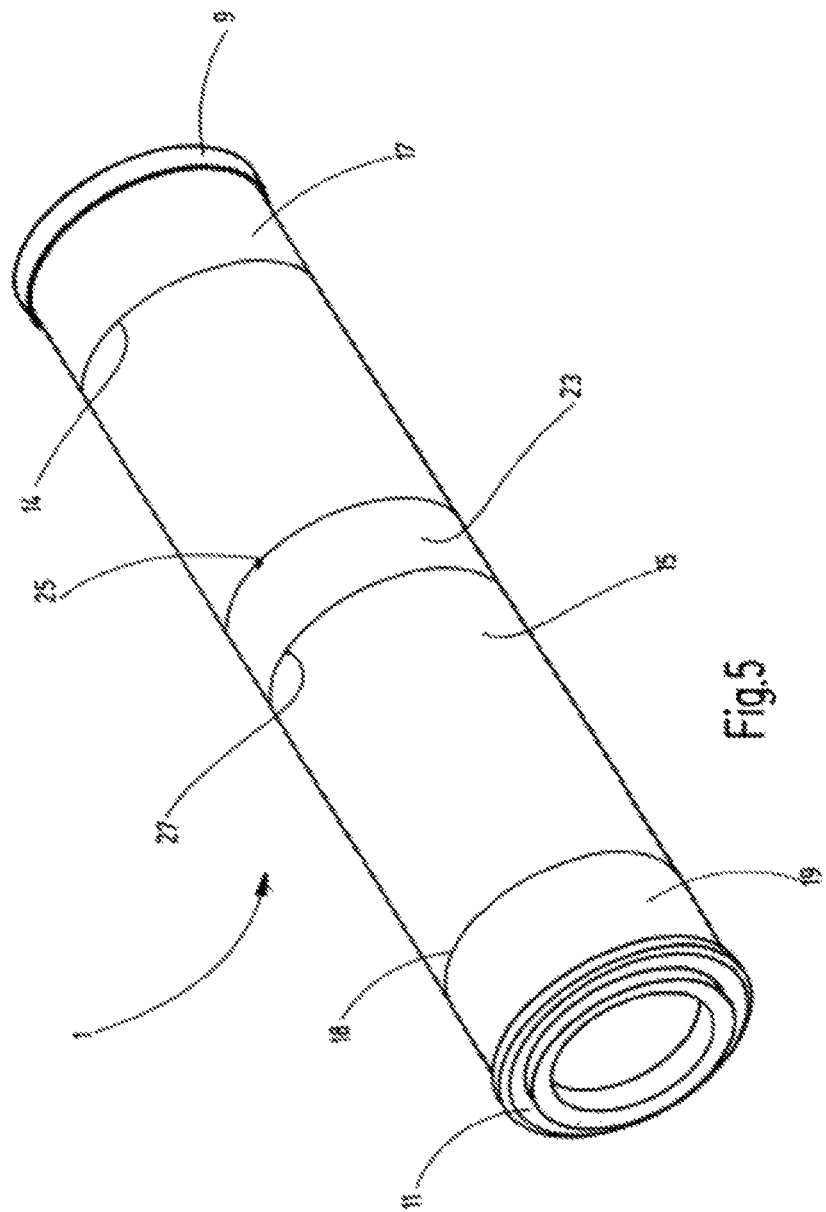

PLEATED FILTER ELEMENT HAVING AN ADDITIONAL STRUCTURE

FIELD OF THE INVENTION

The invention concerns a filter element comprising a pleated filter mat. Each of the ends of the filter mat is attached to an end cap. The filter mat is provided with a main structural layer with filtering properties, as well as at least first and a second additional structural layers. The surface area of each of the additional structural layers is smaller than the surface area of the main structural layer. Moreover, the invention concerns a method for the manufacture of a filter element of this kind.

BACKGROUND OF THE INVENTION

A filter element of this kind is known from DE 10 2004 061 078 A1. The additional structural layers provided in this solution, which extend with a different surface area from one end of the main structural layer at which they are embedded together with the main structural layer in an end cap, have the purpose of optimizing the filtering properties of the filter element. To this end the main structural layer in the known solution may be designed as the main filtration layer with regard to fluid permeability in such a way that large amounts of fluid are able to pass through with a reasonable level of dirt absorption capacity, while the additional structural layers, as pre-filters, have a greater filter fineness. This arrangement improves the operating performance of the filter element, with respect to a cold-start of the connected hydraulics plant, when the fluid to be filtered is still cold and has a correspondingly high viscosity. The main filter poses little flow resistance, and the pre-filter together with parts of the main filter ensure the desired dirt absorption capacity.

SUMMARY OF THE INVENTION

Based upon this prior art, an object of the invention is to provide an improved filter element of the kind described at the outset which, while retaining the described advantages of the prior art, provides stabilization of the pleats of the filter mat through additional structural layers against forces that act during filter operation.

This object is basically met according to the invention through a filter element having, as a significant feature of the invention, axial ends of one additional structural layer located at an axial distance from the axial ends of another additional structural layer. Due to the fact that, contrary to the known solution in which all additional structural layers are embedded together with the main structural layer at a common end into an end cap, in the invention the structural layers are disposed at completely separate positions from each other along the axial length of the filter mat. Pleat stabilization is then achieved in selected areas through additional structural layers that are assigned to certain areas.

In a particularly advantageous manner, two additional structural layers are provided. At each of the two end caps, an additional structural layer each is welded at one end together with the respective end of the main structural layer into the corresponding end cap. This structure not only provides increased stability at both end caps through a concentration of material, while the sections between the end caps, which are free of additional structural layers, have a correspondingly higher flexibility with increased free space between the pleats of the filter mat. Furthermore, the concentration of material ensures a particularly solid embedding of the filter mat in the end caps since, during manufacture of the filter element, more molten material is available during the welding process at the hot end cap, which safely encloses the filter mat. The danger that a bypass is formed at the filter element is then greatly reduced. Since the material concentration, which is required for securely embedding the filter mat into the end cap, does not extend along the entire length of the filter element, the overall volume of the filter mat is reduced, while maintaining the same pleat stability, which in turn leaves more space between the pleats for retaining contaminant particles. Moreover, the then flexible filter mat is able to provide additional flow-exposed surface area due to its inflation at already very low differential pressure.

In advantageous exemplary embodiments, the filter mat may be provided with a third stabilizing additional structural layer. The ends of the third addition structural layer are located at an axial distance from the first structural layer as well as from the second structural layer, which are attached to an end cap. Through a third additional structural layer, which is disposed in this manner, a spacer is provided for longer filter elements through the third additional structural layer, which is, for example, disposed in the center. The spacer stabilizes the pleat geometry along the entire length of the filter element.

The additional structural layers may be provided as stabilizing filler material only, without filtering properties, but may also have filtering properties that are preferably different to the filtering properties of the main structural layer that forms the main filter, and are chosen such that optimal filtering properties are achieved.

The additional structural layers are preferably pleated and are preferably folded with the same type and number of pleats together with the main structural layer. The main structural layer as well as the additional structural layers may comprised of multiple layers.

The additional structural layers may be folded into the filter mat as an external or an internal layer. Moreover, the additional structural layers may be folded into the filter mat at the upstream or downstream side. The axial length of the additional structural layers may vary.

Another object of the invention is to provide an improved method for the manufacture of a filter element having the structure described above with a filter mat including multiple layers folded in one processing step from a preferably multi-layered main structural layer with filtering properties together with at least one further additional structural layer of stabilizing material. Moreover, the filter mat created in this manner is formed into a hollow body that is circumferentially closed along a longitudinal seam. The longitudinal seam may be provided by a welding seam or an adhesive connection. The ends of the hollow body, formed of the main structural layer and at least one additional structural layer, are then enclosed with end caps through welding or by an adhesive. The material of the additional structural layers together with the components of the main structural layer may provide a volume of molten material during the welding process to the end cap.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 5 is a schematically simplified, perspective view according to a second exemplary embodiment of the filter element according to the invention.

DETAILED DESCRIPTION OF THE INVENTION

Figure 1:
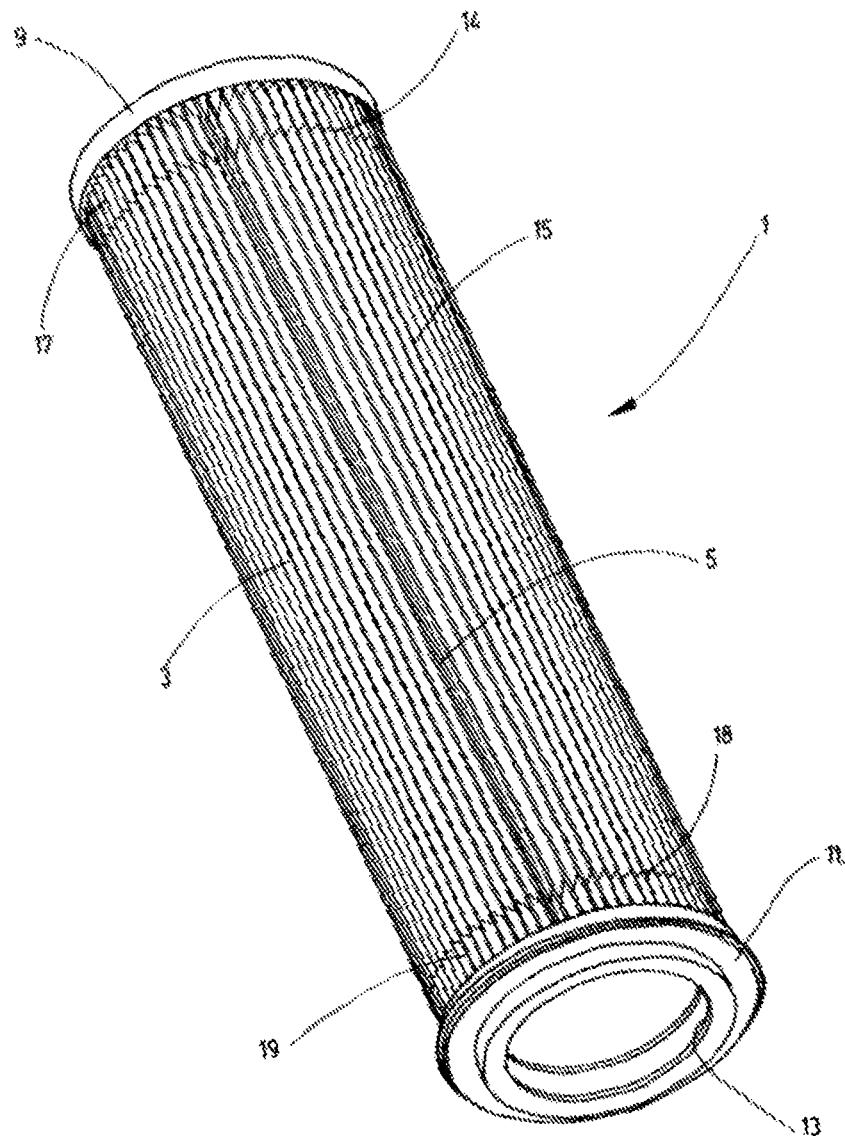
FIG. 1 is a perspective view of a first exemplary embodiment of the filter element according to the invention.
Figure 2:
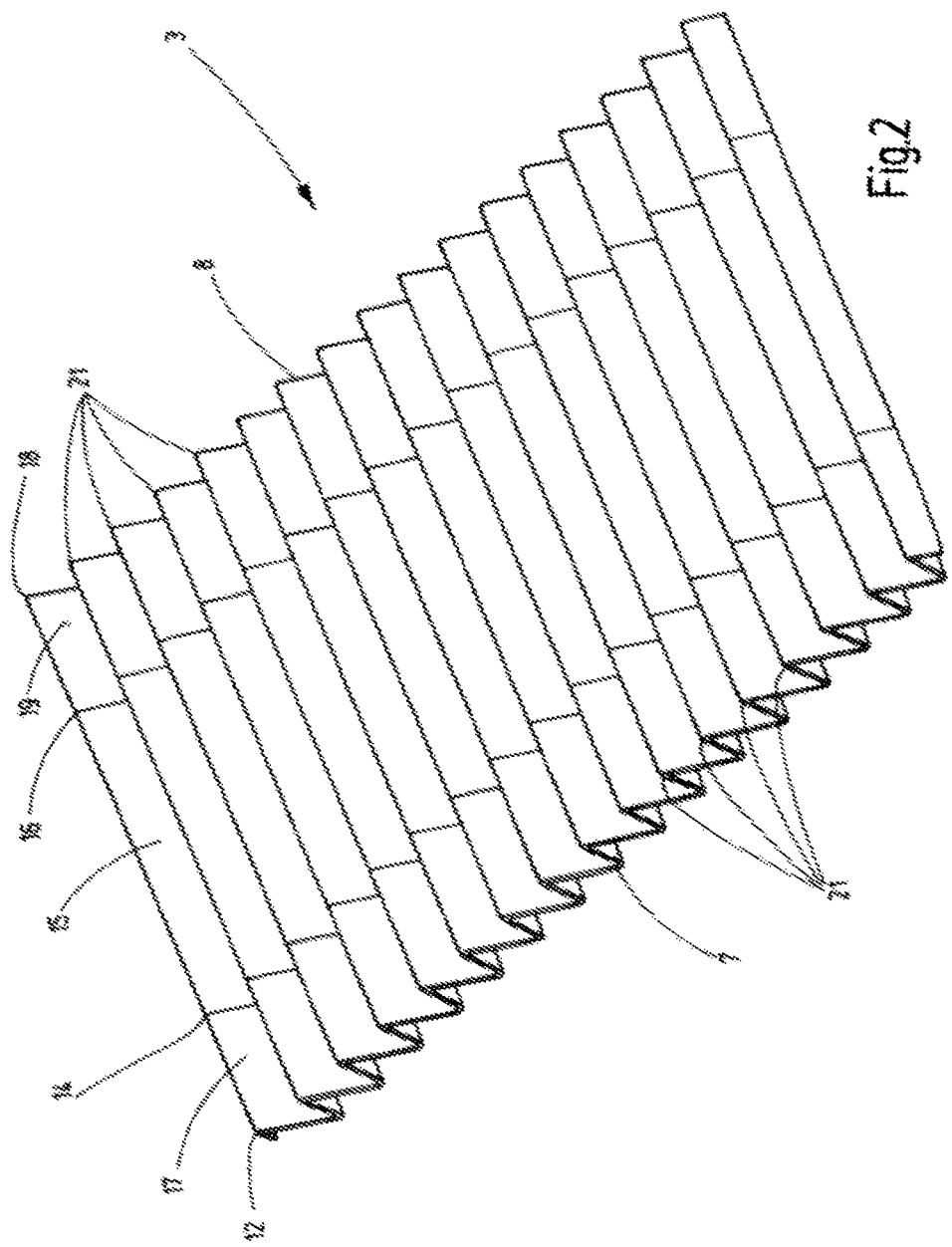
FIG. 2 is a perspective view of a section of the length of the filter mat of the first exemplary embodiment of the filter element shown in a stretched-out state and shown enlarged compared to that of FIG. 1.
Figure 3:
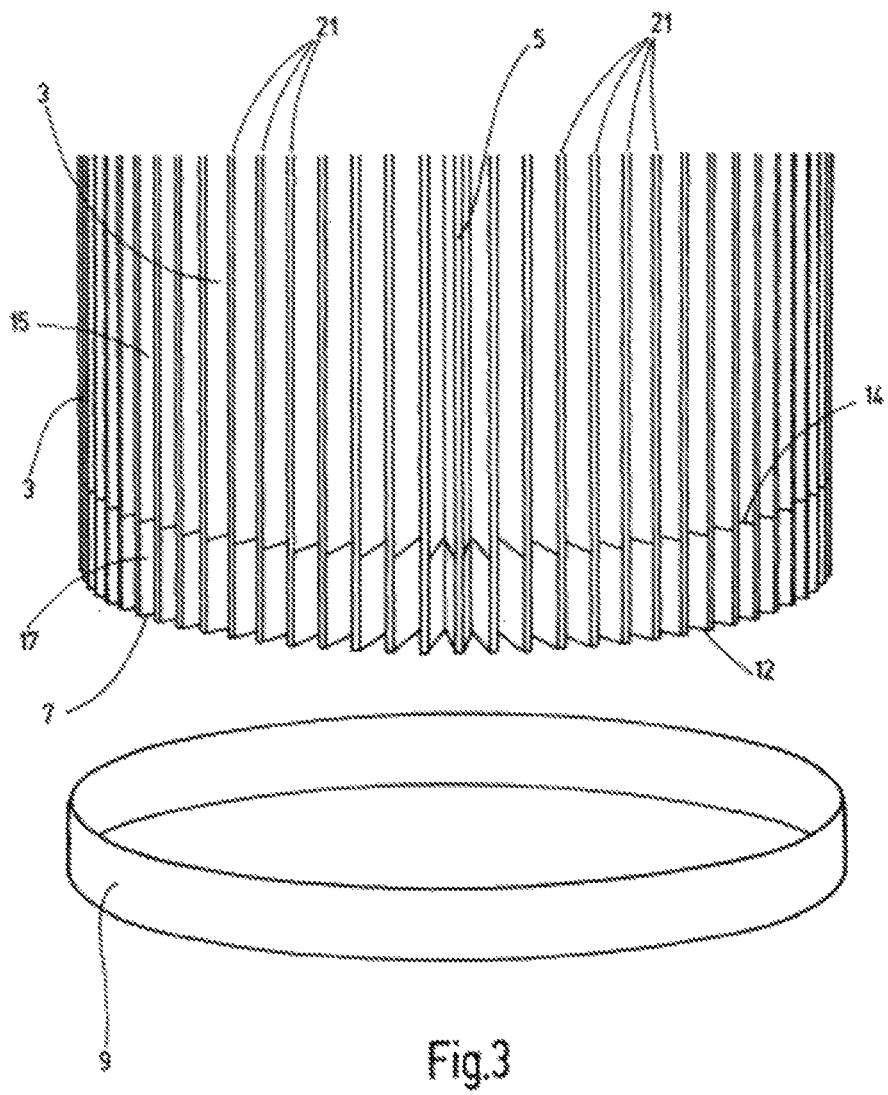
FIG. 3 is a partial perspective view of an end section of the filter mat of the first exemplary embodiment, formed into a hollow body, prior to insertion into an end cap.
Figure 4:
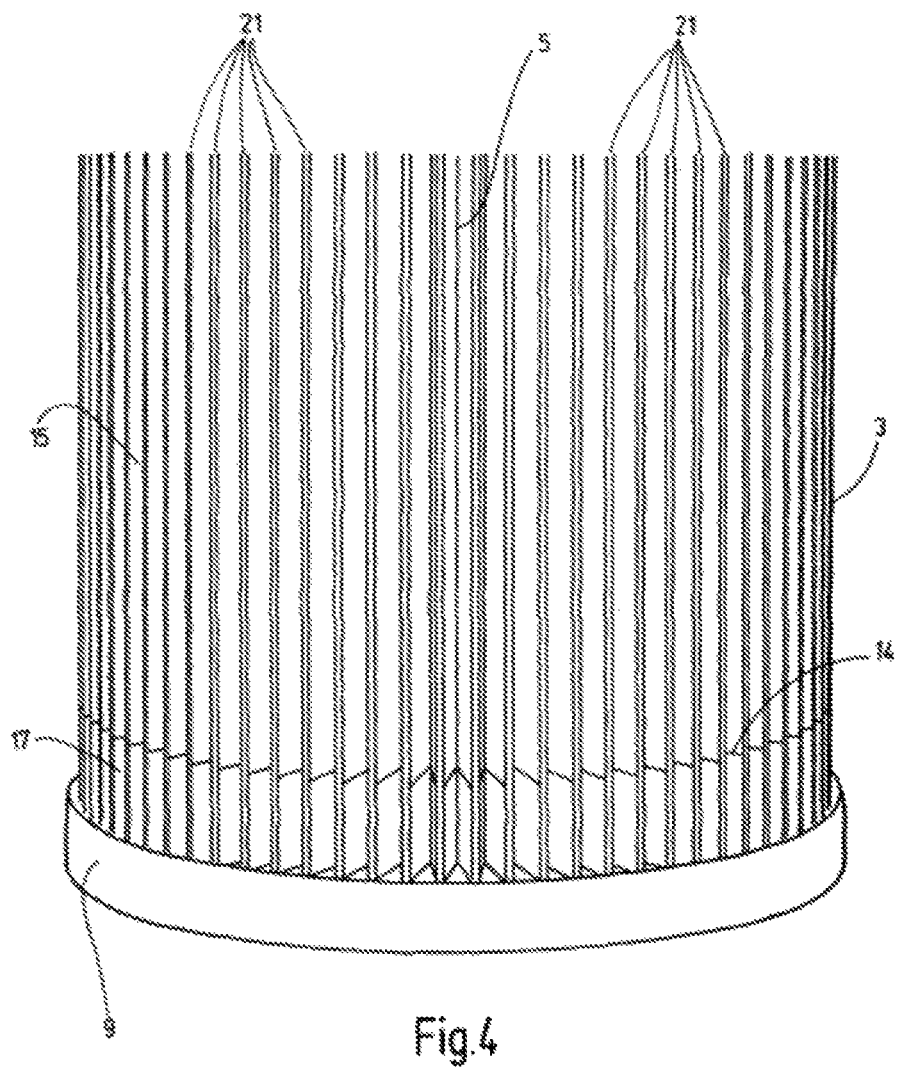
FIG. 4 is a partial perspective view of the filter mat inserted into the end cap of the first exemplary embodiment.

FIG. 1 depicts a filter element 1 according to a first exemplary embodiment of the invention. In a manner usual for circular-cylindrical filter elements, the filter medium is made from a pleated filter mat 3, which is formed into a hollow body that is closed circumferentially through a longitudinal seam 5, implemented through a welding seam or an adhesive connection. The filter mat 3, of which FIG. 2 shows a section of the length of the filter mat in a stretched-out state, is welded or glued into end caps 9 and 11 at the axial ends 7 and 8, respectively. Only one end 17 is visible in FIG. 3. The end caps 9 and 11 form a rim for the end of the filter mat 3, as is common practice with filter elements of this kind. The end cap 9, which is shown at the top in FIG. 1 and is also shown in FIGS. 3 and 4, is made in the form of a closed cap. The lower end cap 11 is provided with a central passage 13 to the inner filter cavity, which is surrounded by the filter mat 3. When the flow travels through the filter mat 3 from outside to inside during filter operation, the inner hollow filter section may be provided with a fluid-permeable supporting tube (not shown in FIG. 1), which is in contact with the inside of filter mat 3. The end caps 9 and 11 are made from a plastic material that is suitable for a welding process, onto which components of the items to be joined will melt when end cap 9, 11 is heated up.

FIG. 2 clearly shows the design of the filter mat 3. From axial end 7 to axial end 8, it is provided with a continuous main structural layer 15, as well as a first additional structural layer 17 and a second additional structural layer 19. Each additional structural layer is shorter than the main structural layer 15. During the folding process in the manufacture of filter mat 3, the additional structural layers 17 and 19 are folded in so that they start from an end 7 or 8 each. More precisely, the additional structural layer 17 starts with its end 12 at the end 7 of the filter material 3. The additional structural layer 19 starts with its end 18 at the end 8 of the filter material 3. The length of each structural layer 17, 19 is only a fraction of the axial length of the main structural layer 15. In practical application, as shown in FIG. 1, the axial length of each additional structural layer 17, 19 is approximately 1/15 of the length of the main structural layer 15. As is common for these kinds of filter materials, the main structural layer 15 is comprised of multiple layers that may include a supporting fabric as a first layer, a protection fleece as a second layer, and a main fleece as third layer. Further layers may be provided as a protection fleece and a supporting fabric. The supporting fabric may be a plastic mesh or a woven plastic if the mat structure is free of metal. The additional structural layers 17, 19 may be a fluid-impermeable plastic material, which forms a stabilizing filler between pleats 21 and be of a material that is suitable for a welding process. Nevertheless, the additional structural layers 17, 19 may, just like components of the main structural layer 15, also be a plastic material with filtering properties, which supplies melt material for the welding process.

The additional structural layers 17, 19 may, during manufacture of the filter mat 3, be folded in together in such a way that the additional structural layers 17, 19 are in contact with the outside of the filter mat 3, as is apparent from FIG. 2, so that the each other facing ends 14 and 16 of the additional structural layers 17 and 19 are visible, as shown in FIG. 2. The additional structural layers 17, 19 may also be folded in on the inside between individual layers of the main structural layer 15, or on the inside or at the back (not visible in FIG. 2). The additional structural layers 17, 19 may advantageously consist of a material that hardens during the folding process or hardens subsequently after application of heat. For example, a prepreg material may be used, preferably being of a base material of carbon fiber or glass fiber. The associated quantity of resin is matched so that the material of the additional structural layers 17, 19 cures during the folding process or hardens in a further processing step through application of heat. Through the concentration of material at the endcaps 9, 11, caused by the additional structural layers 17, 19, a particularly secure embedding of the filter mat 3 into the end caps 9, 11 is ensured since for the welding process. The welding process occurs through the heating up of the end caps 9, 11. More molten material is then available that securely encloses the filter mat 3. Since the material concentration is only present in certain sections, there is no significant increase in the overall material concentration of filter mat 3. Hence, space remains between the pleats 21 to retain contaminant particles. Moreover, the filter mat 3 remains flexible. The greater flexibility in the sections without additional structural layers 17, 19 is advantageous for filter mat 3, for example, in reverse pressure pulses during operation because the flexible filter mat 3 is able to expand, and thus, provide a greater amount of free, flow-exposed surface area.

FIG. 5 depicts a further or second exemplary embodiment of the filter element 1 according to the invention. This second embodiment is of comparatively long construction. In addition to the additional structural layers 17, 19, which extend from the end caps 9 and 11, a third additional structural layer 23 is provided in this example. In the example shown, this third additional layer is folded centrally into the web of filter mat 3, at a distance to the additional structural layers 17, 19, so that it is placed on the outside of the main structural layer 15, like the additional structural layers 17, 19. The ends 25 and 27 of the additional structural layer 23 are located at a distance from the adjacent ends 14 and 16 of the additional structural layers 17 and 19, respectively. The third additional structural layer 23 is of filler material which, like the material of the other additional structural layers 17, 19, cures or may cure during the folding process, and serves as stabilizing spacer that keeps the space between the pleats 21 open over the length of the element. Just like the two other additional structural layers 17 and 19, the third additional structural layer 23 may also be provided with filtering properties or be made of fluid-impermeable filler.

While various embodiments have been chosen to illustrate the invention, it will be understood by those skilled in the art that various changes and modifications can be made therein without departing from the scope of the invention as defined in the claims.

The invention claimed is:

1. A filter element comprising:
first and second end caps being of plastic material suitable for welding;
a pleated filter mat extending along a longitudinal axis and having a main structural layer with first and second main axial ends attached to said first and second end caps, respectively, said main structural layer having a main lateral surface area extending axially and continuously between said first and second main axial ends and having filtering properties; and
first and second additional structural layers being of a prepreg material hardening during a folding process or by application of heat after folding thereof, having first and second surface areas, respectively, and having first and second inner and outer axial ends, respectively, said first and second surface areas each being smaller than said main lateral surface area, said first and second inner axial ends facing one another, being spaced axially from and beyond said first and second end caps along said longitudinal axis and being spaced at an axial distance along said longitudinal axis from one another, each said first and second outer axial ends and each of said first and second main axial ends being welded directly into and to said first and second end caps, respectively, by melting thereof upon heating said first and second end caps, said first and second additional structural layers being pleated and folded together with said main structural layer into said filter mat, said first and second additional structural layers being without filtering properties.

2. A filter element according to claim 1 wherein
a stabilizing layer is attached to said main structural layer and has opposite first and second stabilizer axial ends spaced at an axial distance along said longitudinal axis from said first and second inner axial ends, respectively.

3. A filter element according to claim 2 wherein
said stabilizing layer is without filtering properties.

4. A filter element according to claim 1 wherein
said first and second additional structural layers are pleated with a same type and number of pleats.

5. A filter element according to claim 1 wherein
each of said main structural layer and of said first and second additional structural layers are made of multiple layers.

6. A filter element according to claim 1 wherein
said first and second additional structural layers are folded onto outer or inner surfaces of said main structural layer.

7. A filter element according to claim 1 wherein
said first and second additional structural layers are folded onto upstream or downstream sides of said main structural layer.

8. The filter element according to claim 1 wherein
said additional structural layers have variable lengths.

9. A method of manufacturing a filter element comprising the steps of:
providing a main structural layer extending along a longitudinal axis with filtering properties, with first and second main axial ends and with a main lateral surface area extending axially and continuously between the first and second main axial ends;
providing first and second additional structural layers being of a prepreg material hardening during a folding process or by application of heat after folding thereof, having first and second surface areas and having first inner and outer axial ends and second inner and outer axial ends, respectively, such that the first and second outer axial ends are adjacent the first and second main axial ends, respectively, with the first and second inner axial ends facing one another and being spaced at an axial distance along the longitudinal axis from one another and with the first and second surface areas being smaller than the main lateral surface area, the first and second additional structural layers being without filtering properties;
pleating and folding the main structural layer and the first and second additional structural layers together into a circumferentially closed and hollow filter mat with a longitudinal seam; and
welding each of the first and second main axial ends and each of the first and second outer axial ends directly into and to first and second end caps being of plastic material suitable for welding, respectively, upon melting thereof upon heating, with the first and second inner axial ends being spaced axially from and beyond the first and second end caps along the longitudinal axis.

10. A method according to claim 9 wherein
the main structural layer is multi-layered.

11. A method according to claim 9 wherein
a stabilizing layer is attached to the main structural layer and has opposite first and second stabilizer axial ends spaced at an axial distance along the longitudinal axis from the first and second inner axial ends, respectively.

12. A method according to claim 11 wherein
the stabilizing layer is without filtering properties.

13. A method according to claim 9 wherein
the first and second additional structural layers are pleated with a same type and number of pleats.

14. A method according to claim 9 wherein
each of the main structural layer and of the first and second additional structural layers are made of multiple layers.

15. A method according to claim 9 wherein
the first and second additional structural layers are folded onto outer or inner surfaces of the main structural layer.

16. A method according to claim 9 wherein
the first and second additional structural layers are folded onto upstream or downstream sides of the main structural layer.

17. A filter element comprising:
first and second end caps being of plastic material suitable for welding;
a pleated filter mat extending along a longitudinal axis and having a main structural layer with first and second main axial ends attached to said first and second end caps, respectively, said main structural layer having a main lateral surface area extending axially and continuously between said first and second main axial ends and having filtering properties; and
first and second additional structural layers being of a prepreg material hardening during a folding process or by application of heat after folding thereof, having first and second surface areas, respectively, and having first and second inner and outer axial ends, respectively, said first and second surface areas each being smaller than said main lateral surface area, said first and second inner axial ends facing one another, being spaced axially from and beyond said first and second end caps along said longitudinal axis and being spaced at an axial distance along said longitudinal axis from one another, each said first and second outer axial ends and each of said first and second main axial ends being welded directly into and to said first and second end caps, respectively, by melting thereof upon heating said first and second end caps, said first and second additional structural layers being pleated and folded together with said main structural layer into said filter mat, each of said main structural layer and of said first and second additional structural layers being made of multiple layers.

18. A method of manufacturing a filter element comprising the steps of:

providing a main structural layer extending along a longitudinal axis with filtering properties, with first and second main axial ends and with a main lateral surface area extending axially and continuously between the first and second main axial ends;

providing first and second additional structural layers being of a prepreg material hardening during a folding process or by application of heat after folding thereof, having first and second surface areas and having first inner and outer axial ends and second inner and outer axial ends, respectively, such that the first and second outer axial ends are adjacent the first and second main axial ends, respectively, with the first and second inner axial ends facing one another and being spaced at an axial distance along the longitudinal axis from one another and with the first and second surface areas being smaller than the main lateral surface area, each of the main structural layer and of the first and second additional structural layers being made of multiple layers;

pleating and folding the main structural layer and the first and second additional structural layers together into a circumferentially closed and hollow filter mat with a longitudinal seam; and welding each of the first and second main axial ends and each of the first and second outer axial ends directly into and to first and second end caps being of plastic material suitable for welding, respectively, upon melting thereof upon heating, with the first and second inner axial ends being spaced axially from and beyond the first and second end caps along the longitudinal axis.

* * * * *